(12) United States Patent
Browne et al.

(10) Patent No.: US 7,607,739 B2
(45) Date of Patent: Oct. 27, 2009

(54) AIR ROUTING SYSTEM AND METHOD FOR USE WITH A VEHICLE SEAT

(75) Inventors: Thomas A. Browne, Essington (GB); Christopher Morrison, Swindon (GB); Anthony Torris, St. Agnes (GB)

(73) Assignee: Lear Corporation, Southfield, MI (US)

( * ) Notice: Subject to any disclaimer, the term of this patent is extended or adjusted under 35 U.S.C. 154(b) by 88 days.

(21) Appl. No.: 11/382,105

(22) Filed: May 8, 2006

(65) Prior Publication Data

US 2007/0257541 A1 Nov. 8, 2007

(51) Int. Cl.
 *A47C 7/02* (2006.01)
 *A47C 7/72* (2006.01)

(52) U.S. Cl. .................. 297/452.42; 297/180.14; 297/180.1

(58) Field of Classification Search ............. 297/180.1, 297/180.13, 180.14, 452.42
 See application file for complete search history.

(56) References Cited

U.S. PATENT DOCUMENTS

| | | | |
|---|---|---|---|
| 5,385,382 A * | 1/1995 | Single et al. | 297/180.13 |
| 6,003,950 A | 12/1999 | Larsson | |
| 6,059,018 A * | 5/2000 | Yoshinori et al. | 165/42 |
| 6,189,966 B1 * | 2/2001 | Faust et al. | 297/180.14 |
| 6,478,369 B1 * | 11/2002 | Aoki et al. | 297/180.13 |
| 6,786,541 B2 | 9/2004 | Haupt et al. | |
| 6,857,697 B2 | 2/2005 | Brennan et al. | |
| 6,869,139 B2 | 3/2005 | Brennan et al. | |
| 7,261,372 B2 * | 8/2007 | Aoki | 297/180.14 |
| 2003/0102699 A1 | 6/2003 | Aoki et al. | |
| 2004/0160093 A1 | 8/2004 | Stoewe | |
| 2004/0164594 A1 | 8/2004 | Stoewe et al. | |
| 2005/0093347 A1 | 5/2005 | Bajic et al. | |
| 2005/0161986 A1 | 7/2005 | Brennan et al. | |
| 2005/0264086 A1 | 12/2005 | Lofy et al. | |
| 2005/0280294 A1 | 12/2005 | Ishima et al. | |
| 2006/0087160 A1 | 4/2006 | Dong et al. | |
| 2007/0176471 A1 * | 8/2007 | Knoll | 297/180.14 |

FOREIGN PATENT DOCUMENTS

| | | |
|---|---|---|
| EP | 0042160 A2 | 6/1981 |
| EP | 0424160 A1 | 4/1991 |
| EP | 0834421 A1 | 4/1998 |
| EP | 1084875 A2 | 3/2001 |
| KR | 200294253 A | 12/2002 |
| WO | 02053400 A2 | 7/2002 |

OTHER PUBLICATIONS

Translation of Japanese Published Unexamied Patent Application (A) No. 07-287532.*

* cited by examiner

*Primary Examiner*—Sarah B McPartlin
(74) *Attorney, Agent, or Firm*—Brooks Kushman P.C.

(57) ABSTRACT

A system and method for routing air within a vehicle seat is provided. The system includes an airflow connector configured to provide a substantially airtight seal between a plenum member and an air conditioning device. The system is configured to improve the assembly of the airflow connector to a plenum member.

19 Claims, 4 Drawing Sheets

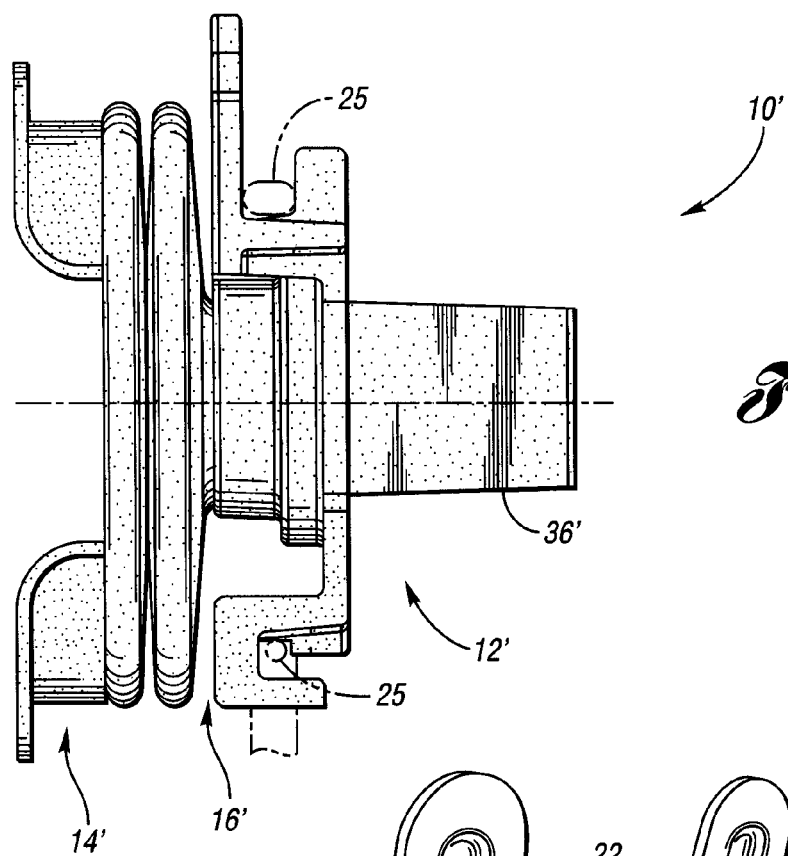
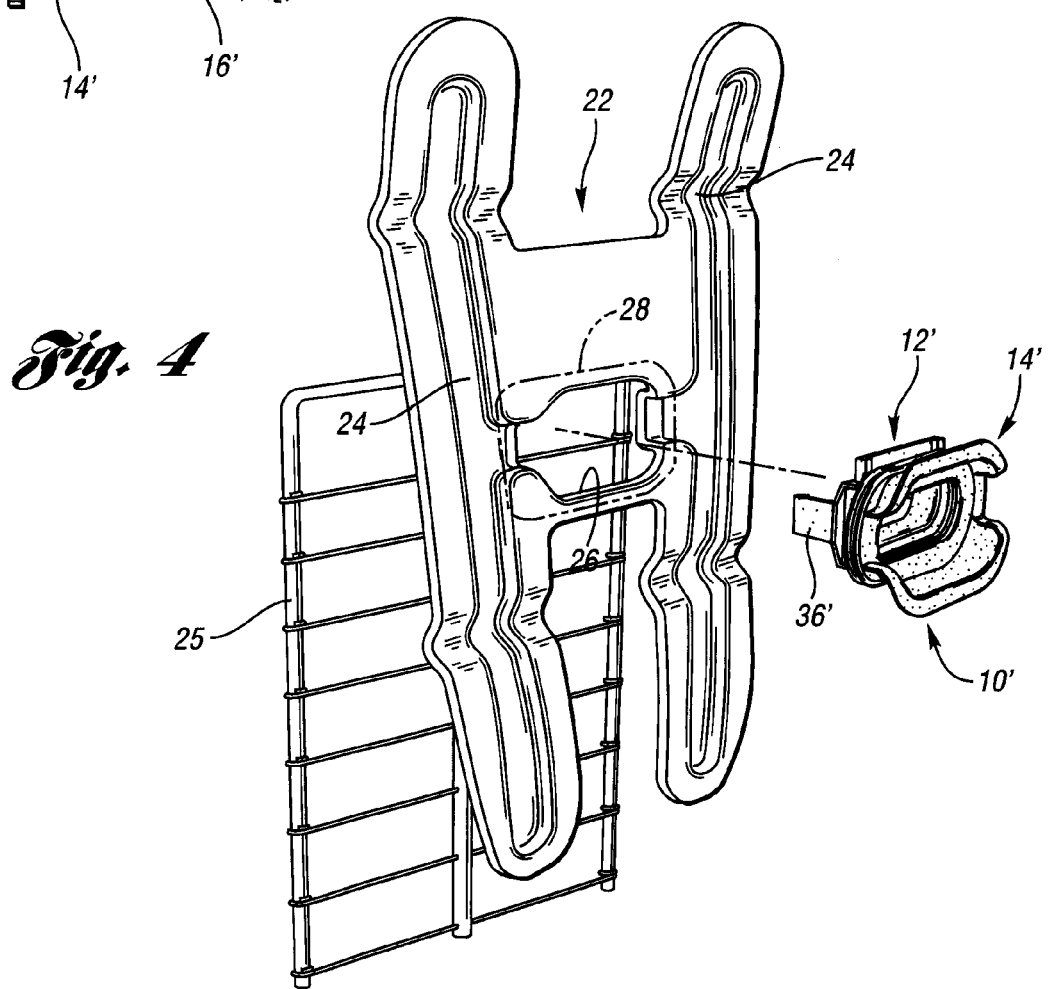

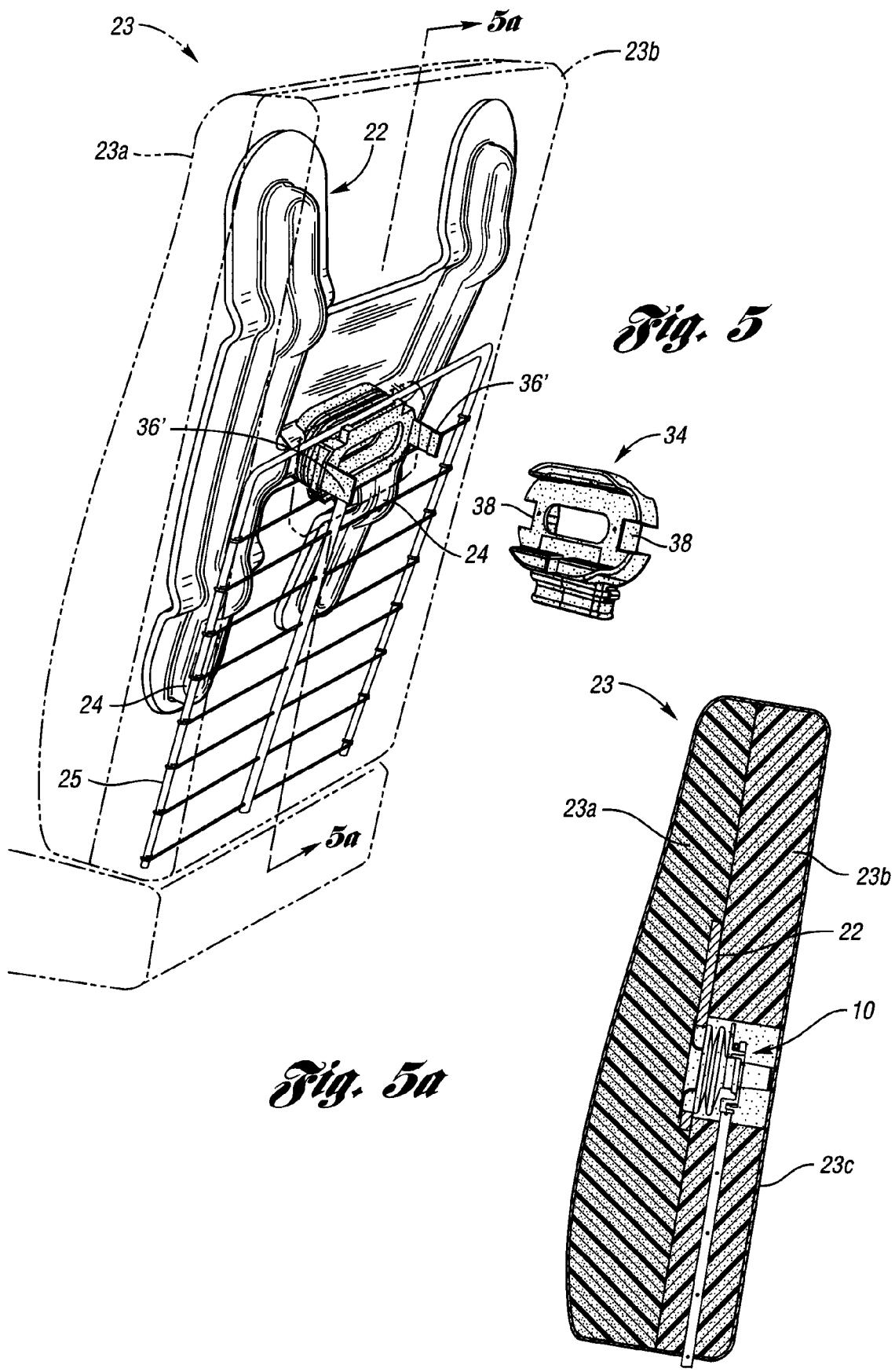

AIR ROUTING SYSTEM AND METHOD FOR USE WITH A VEHICLE SEAT

BACKGROUND OF THE INVENTION

1. Field of the Invention

The invention generally relates to air routing systems and methods for use with a vehicle seat.

2. Background Art

Air routing systems can provide ventilation for vehicle seats. Air routing systems can include a channel liner and scrim located within a cushion of a seat. The cushion generally provides an access opening through which other components of the air routing system access the channel liner. When assembled, the channel liner and scrim form air passages. These passages assist in distributing air throughout the cushion. Holes in the scrim allow air to escape thereby ventilating the seat.

Air routing systems can also include a thermal electric device (TED). The TED can be used to heat air that will ventilate the seat.

A mounting plate can be used to provide an air passage from the TED toward the channel liner. A first face of the mounting plate can be fixed to the TED with mechanical clips. A second face of the mounting plate can then be secured to the cushion surrounding the access opening with velcro.

The mounting plate may not provide a substantially air tight passage from the TED to the channel liner because the mounting plate is not directly secured to the channel liner. The loss of air between the TED and channel liner may affect the efficiency of the air routing system.

The location of the second face of the mounting plate relative to the access opening may vary because an operator positions the mounting plate relative to the access opening. This potential for variability may affect the ease with which the air routing system is assembled.

SUMMARY OF THE INVENTION

A system and method for routing air within a vehicle seat is provided. The system includes an airflow connector configured to provide a substantially airtight seal between a plenum member and an air conditioning device. The system is configured to improve the assembly of an airflow connector to a plenum member.

An aspect of the invention provides an airflow connector for use with a vehicle seat air routing system. The air routing system includes an air conditioning device and a plenum member with an opening. The airflow connector includes a first portion, a second portion, and a body portion configured to extend between the first and second portions. The first portion of the airflow connector is configured to receive the air conditioning device. The body portion of the airflow connector is insertable into the opening of the plenum member such that a surface of the second portion of the airflow connector is adjacent to the plenum member. The body portion of the airflow connector is disposable between the plenum member and the first portion of the airflow connector.

The first portion of the airflow connector may be rigid and the body portion of the airflow connector may be flexible.

The first portion of the airflow connector may be bonded to the body portion of the airflow connector.

The first portion of the airflow connector may be mechanically fixed to the body portion of the airflow connector.

The first portion of the airflow connector may be co-molded with the body portion of the airflow connector.

The second portion of the airflow connector may be configured to be adhered to the plenum member.

The second portion of the airflow connector may be configured to be welded to the plenum member.

An aspect of the invention provides a vehicle seat. The vehicle seat includes an airflow connector having a first portion, a second portion, and a body portion that extends between the first and second portions. The vehicle seat also includes an air conditioning device. The air conditioning device includes a connecting portion that receives the first portion of the airflow connector. The vehicle seat further includes a plenum member. The plenum member includes a receiving surface that receives the second portion of the airflow connector. The receiving surface is disposed between the first and second portions of the airflow connector. The body portion of the airflow connector is disposed between the plenum member and the first portion of the airflow connector.

The first portion of the airflow connector may be rigid and the body portion of the airflow connector may be flexible.

The body portion of the airflow connector may be configured as a bellows.

The first portion of the airflow connector may be bonded to the body portion of the airflow connector.

The first portion of the airflow connector may be mechanically fixed to the body portion of the airflow connector.

The second portion of the airflow connector may be adhered to the plenum member.

The second portion of the airflow connector may be welded to the plenum member.

The receiving surface may include a recessed area.

The receiving surface may include a feature that orients the airflow connector in a desired position.

The first portion, second portion, and body portion of the airflow connector may be formed as a single piece.

The airflow connector and plenum member may be formed as a single piece.

An aspect of the invention provides a method for assembling an air routing system for use with a vehicle seat. The method includes inserting an airflow connector into an opening of a plenum member such that the plenum member is disposed between first and second portions of the airflow connector. The method also includes attaching the first portion of the airflow connector to an air conditioning device.

The method may include attaching the first portion of the airflow connector to a body portion of the airflow connector such that the body portion extends between the first and second portions.

The invention provides for a substantially air tight passage between an air conditioning device and plenum member.

The invention provides for the improved assembly of a plenum member and airflow connector.

BRIEF DESCRIPTION OF THE DRAWINGS

FIG. 3 is a side view of an embodiment of the invention;

FIG. 4 is a front perspective view of an embodiment of the invention;

FIG. 5 is a rear perspective view of the embodiment of FIG. 4;

FIG. 5a is a cross section of the embodiment of FIG. 5;

FIG. 6 is an alternative embodiment of a component of the invention of FIGS. 4, 5, and 5a.

DETAILED DESCRIPTION OF THE PREFERRED EMBODIMENT(S)

Figure 1:
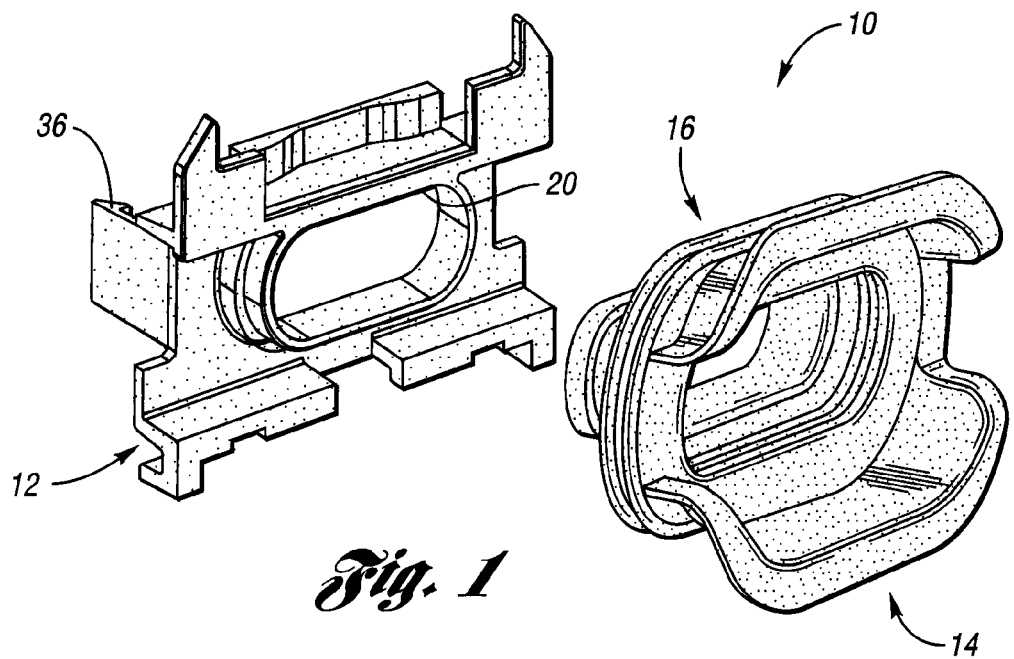
FIG. 1 is a perspective view of an embodiment of the invention.
Figure 2:
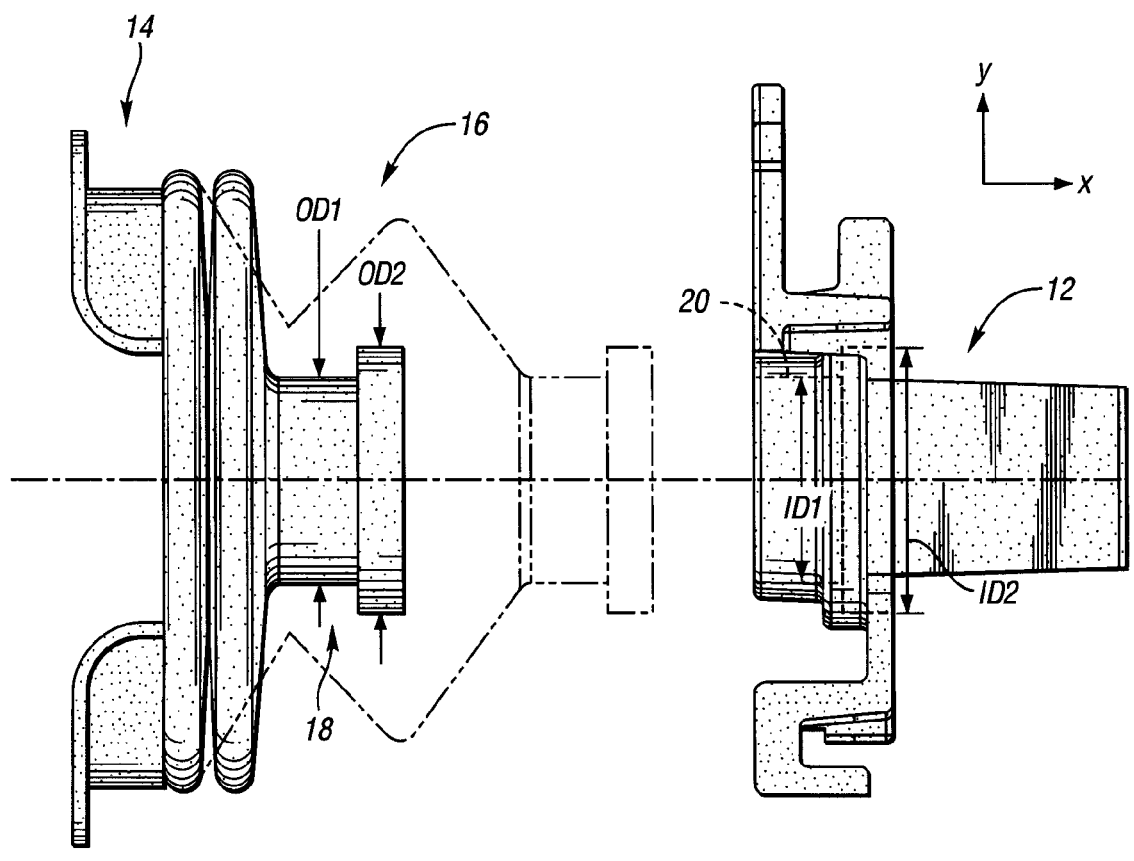
FIG. 2 is a side view of the embodiment of FIG. 1.

FIGS. 1 and 2 illustrate a two-piece embodiment of an airflow connector 10 according to the invention. The airflow connector 10 has a first portion 12, a second portion 14, and a body portion 16. The body portion 16 is configured to extend between the first portion 12 and the second portion 14.

Each of the pieces of the airflow connector 10 may exhibit similar or different material characteristics. These material characteristics can be selected to improve the assembly of the air flow connector 10, and to improve the assembly of the airflow connector 10 with other components of an air routing system, as described below in detail. In the embodiment of FIGS. 1 and 2, the first portion 12 is made of a rigid material, such as a Polybutylene Terephthalate (PBT) or Acrylonittile Butadiene Styrene (ABS), whereas the second portion 14 and body portion 16 are made of a flexible material, such as a Thermoplastic Elastomer (TPE).

During assembly of the airflow connector 10, the first portion 12 may be connected to the body portion 16 in any suitable manner, such as by bonding or mechanically fixing the components together. In the embodiment of FIGS. 1 and 2, the first portion 12 is configured to be mechanically fixed to the body portion 16. More specifically, a flexible end 18 of the body portion 16 may be inserted, along the x-direction, into a rigid opening 20 of the first portion 12. The flexible end 18 has a first outer diameter (OD1) and a second outer diameter (OD2) both in the y-direction. OD2 is generally greater than OD1. The rigid opening 20 has a first inner diameter (ID1) and a second inner diameter (ID2) both in the y-direction. ID2 is generally greater than ID1. The flexible end 18 is inserted into the rigid opening 20 of the first portion 12 such that OD2 of the flexible end 18 rests within ID2 of the first portion 12. OD1 of flexible end 18 is approximately equal to ID1 of the first portion 12. OD2 of the flexible end 18 is approximately equal to ID2 of the first portion 12. The flexible nature of end 18 facilitates the insertion of the end 18 into the rigid opening 20. The seating of the flexible end 18 within the first portion 12 forms a substantially air tight seal between the first portion 12 and the body portion 16.

The body portion 16 may be designed to allow for relative translation and rotation between the first portion 12 and the second portion 14. In the embodiment of FIGS. 1 and 2, the body portion 16 is configured as a bellows. When the airflow connector 10 experiences forces that would induce relative displacement between the first portion 12 and the second portion 14, the bellows configuration of the body portion 16 allows for such displacement.

FIG. 3 illustrates a one-piece embodiment of an airflow connector 10' similarly configured to the airflow connector 10 of FIGS. 1 and 2. The airflow connector 10' has a first portion 12', a second portion 14', and a body portion 16'. The body portion 16' is configured to extend between the first portion 12' and the second portion 14'.

Each of the portions of the airflow connector 10' may exhibit similar or different material characteristics. In the embodiment of FIG. 3, the first portion 12' is rigid whereas the second portion 14' and body portion 16' are flexible. These respective material characteristics may facilitate the connection of the airflow connector 10' to other components of an air routing system as discussed below in detail.

In the embodiment of FIG. 3, the first portion 12' is made of a rigid material, such as a PBT or ABS, whereas the second portion 14' and body portion 16' are made of a flexible material, such as a TPE. In the embodiment of FIG. 3, the first portion 12' is co-molded with the second portion 14' and body portion 16'.

FIGS. 4, 5, and 5a illustrate an embodiment of a plenum member 22 that can route air within a vehicle seat 23. The vehicle seat includes a front cushion 23a, a rear cushion 23b, and a trim cover 23c. The plenum member 22 is disposed between the front cushion 23a and the rear cushion 23b. In the embodiment of FIGS. 4, 5, and 5a, the front cushion 23a is air permeable. In alternative embodiments (not shown), the front cushion 23a may be air impermeable and include holes that allow air to escape from the plenum member 22.

In still other alternative embodiments (not shown), the seat 23 may include only a single cushion. A front surface of the cushion may include a recessed area configured to receive the plenum member 22 and provide an opening through which components of an air routing system may pass. A scrim or other covering member may be assembled with the plenum member 22 to form air passages with channels 24 of the plenum member 22. Holes in the scrim would allow air to escape the assembly. Alternatively, a rear surface of the cushion may include a recessed area configured to receive the plenum member 22 or the plenum member 22 and scrim assembly. The cushion may be air permeable. The cushion may also be air impermeable and include holes that allow air to escape from the plenum member 22 or plenum member 22 and scrim assembly.

The air is routed through channels 24 formed by the plenum member 22. The plenum member 22 provides an opening 26 and receiving surface 28 that receives the airflow connector 10'. The airflow connector 10' is inserted into the opening 26 of the plenum member 22 such that the receiving surface 28 is disposed between the second portion 14' and the first portion 12' of the airflow connector 10'. Once inserted, the second portion 14' forms a substantially airtight seal between the plenum member 22 and airflow connector 10'.

The second portion 14' may be adhered or welded to the plenum member 22 to further form a substantially airtight seal between the plenum member 22 and the airflow connector 10'. In the embodiment of FIGS. 4, 5, and 5a, the second portion 14' is ultrasonically welded to the plenum member 22.

In an alternative embodiment, the airflow connector 10' may be co-molded with the plenum member 22 thus forming a single piece.

The vehicle seat 23 also includes a seat frame 25. The seat frame 25 can provide support for components of the vehicle seat 23 including the front cushion 23a, the rear cushion 23b, and the first portion 12' of the airflow connector 10'. The first portion 12' of the airflow connector 10' can thus be assembled to the seat frame 25 as shown in FIGS. 3, 5, and 5a.

Figure 6:
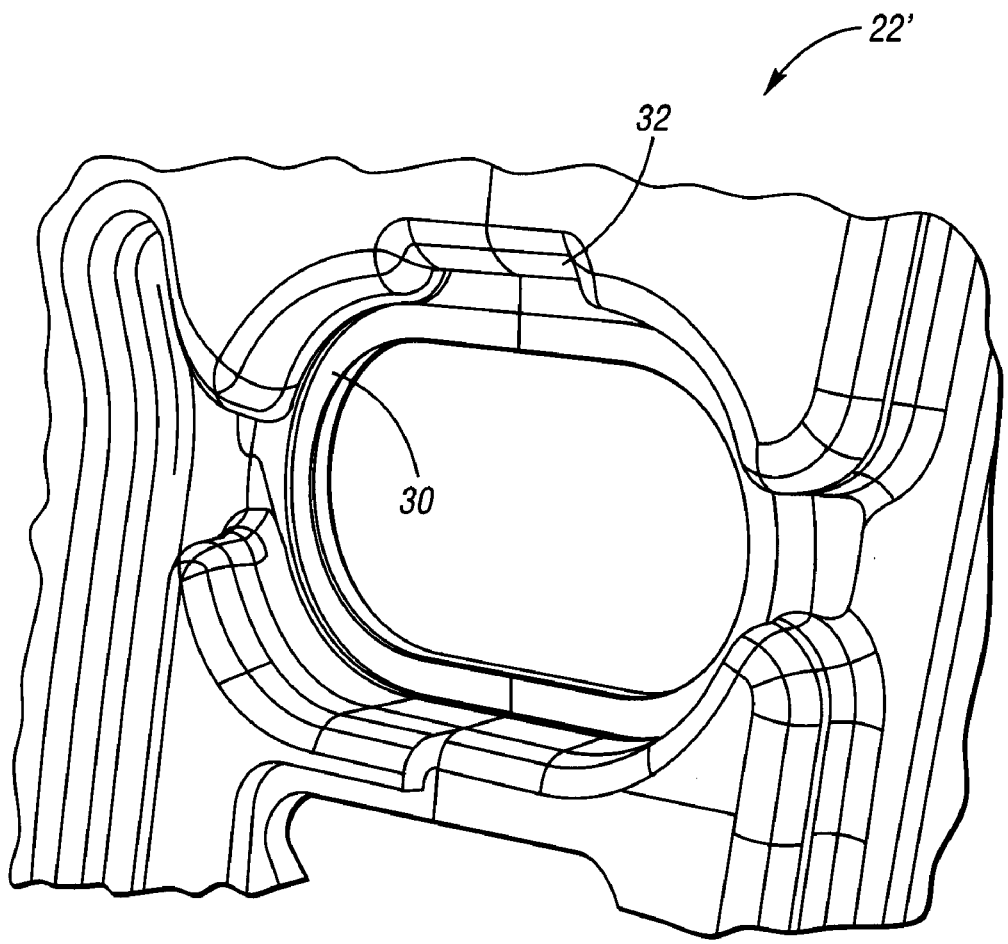

FIG. 6 illustrates a portion of an alternative embodiment of a plenum member 22' similarly configured to the plenum member 22 of FIGS. 4, 5, and 5a. The recessed area 30 is configured to receive the second portion 14' of the airflow connector 10'. The recessed area 30 may assist with the assembly of the airflow connector 10' to the plenum member 22' by locating the second portion 14' of the airflow connector 10' on the plenum member 22'. The recessed area 30 may further serve to form a substantially air tight seal between the second portion 14' and the plenum member 22'.

The plenum member 22' may further include an orienting feature 32. In the embodiment of FIG. 6, the orienting feature 32 is a key way poke-yoke. The orienting feature 32 can assist in orienting an airflow connector (not shown) with a portion designed to fit within the orienting feature 32.

FIG. 5 further illustrates an air conditioning device 34 configured to be received by the first portion 12' of the airflow connector 10'. The air conditioning device 34 is located within the trim cover 23c of the seat 23. In the embodiment of FIG. 5, the air conditioning device 34 is a thermal-electric device (TED) and is used to heat or cool air before it enters into the airflow connector 10'. The first portion 12' provides clipping members 36' that clip onto clipping surfaces 38 of the air conditioning device 34. The clipping members 36' are similarly configured to clipping members 36 of the airflow connector 10 (FIG. 1). Once clipped in place, the airflow connector 10' forms a substantially air tight seal between the air conditioning device 34 and the airflow connector 10'.

The air routing system of the embodiment of FIG. 5 thus includes the plenum member 22, the airflow connector 10', and the air conditioning device 34.

Figure 7:
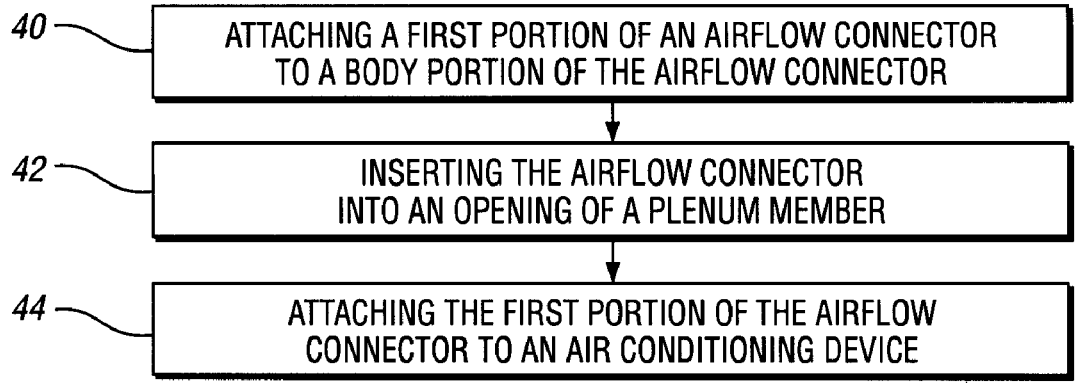
FIG. 7 is a flow chart of a method of the invention.

FIG. 7 shows a method for assembling an air routing system for use with a vehicle seat. At block 40, a first portion 12 of an airflow connector 10 is attached to a body portion 16 of the airflow connector 10. At block 42, the airflow connector 10 is inserted into an opening 26 of a plenum member 22 such that the plenum member 22 is disposed between a second portion 14 of the airflow connector 10 and the first portion 12 of the airflow connector 10. The first portion 12 of the airflow connector 10 can then be assembled to a seat frame 25. At block 44, the first portion 12 of the airflow connector 10 is attached to an air conditioning device 34.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An airflow connector for use with a vehicle seat air routing system, the air routing system including an air conditioning device and a plenum member, the plenum member having first and second sides and a passageway from the first side to the second side, the air flow connector comprising:
   a first portion, a second portion, and a body portion configured to extend between the first and second portions, the first portion of the airflow connector being configured to receive the air conditioning device, the body portion of the airflow connector being insertable through the passageway of the plenum member such that a surface of the second portion of the airflow connector engages the second side of the plenum member and the first and second sides of the plenum member are positioned between the first and second portions of the airflow connector thereby forming a substantially airtight passage from the air conditioning device to the plenum member.

2. The airflow connector of claim 1 wherein the first portion of the airflow connector is rigid and the body portion of the airflow connector is flexible.

3. The airflow connector of claim 1 wherein the first portion of the airflow connector is bonded to the body portion of the airflow connector.

4. The airflow connector of claim 1 wherein the first portion of the airflow connector is mechanically fixed to the body portion of the airflow connector.

5. The airflow connector of claim 1 wherein the first portion of the airflow connector is co-molded with the body portion of the airflow connector.

6. The airflow connector of claim 1 wherein the second portion of the airflow connector is configured to be adhered to the plenum member.

7. The airflow connector of claim 1 wherein the second portion of the airflow connector is configured to be welded to the plenum member.

8. A vehicle seat comprising:
   a cushion;
   an airflow connector having a first portion, a second portion, and a body portion that extends between the first and second portions;
   an air conditioning device including a connecting portion that receives the first portion of the airflow connector; and
   a plenum member adjacent the cushion and including a first side and a second side that receives the second portion of the airflow connector, the first and second sides being disposed between the first and second portions of the airflow connector, the body portion of the airflow connector extending from the first side of the plenum member to the second side of the plenum member thereby forming a substantially airtight passage from the air conditioning device to the plenum member.

9. The seat of claim 8 wherein the first portion of the airflow connector is rigid and the body portion of the airflow connector is flexible.

10. The seat of claim 9 wherein the body portion of the airflow connector is configured as a bellows.

11. The seat of claim 8 wherein the first portion of the airflow connector is bonded to the body portion of the airflow connector.

12. The seat of claim 8 wherein the first portion of the airflow connector is mechanically fixed to the body portion of the airflow connector.

13. The seat of claim 8 wherein the second portion of the airflow connector is adhered to the plenum member.

14. The seat of claim 8 wherein the second portion of the airflow connector is welded to the plenum member.

15. The seat of claim 8 wherein the second side includes a recessed area.

16. The seat of claim 8 wherein the second side includes a feature that orients the airflow connector in a desired position.

17. The seat of claim 8 wherein the first portion, the second portion, and the body portion of the airflow connector are formed as a single piece.

18. The seat of claim 8 wherein the airflow connector and plenum member are formed as a single piece.

19. A method for assembling an air routing system for use with a vehicle seat, the method comprising:
   providing a plenum member having first and second sides and a passageway from the first side to the second side;
   providing an airflow connector having a first portion, a second portion, and a body portion extending between the first and second portions;
   inserting the body portion through the passageway of the plenum member such that a surface of the second portion engages the second side of the plenum member and the first and second sides of the plenum member are disposed between the first and second portions of the airflow connector; and
   attaching the first portion of the airflow connector to an air conditioning device.

* * * * *